United States Patent

Maruyama

[11] Patent Number: 6,118,594
[45] Date of Patent: Sep. 12, 2000

[54] OBJECTIVE LENS FOR OPTICAL PICK-UP

[75] Inventor: Koichi Maruyama, Saitama-ken, Japan

[73] Assignee: Asahi Kogaku Kogyo Kabushiki Kaisha, Tokyo, Japan

[21] Appl. No.: 09/339,901

[22] Filed: Jun. 29, 1999

[30] Foreign Application Priority Data

Jun. 26, 1998 [JP] Japan ................................ 10-218490

[51] Int. Cl.[7] .............................. G02B 13/18; G02B 3/08; G02B 27/44
[52] U.S. Cl. ............................................ 359/719; 359/565
[58] Field of Search ...................................... 359/718, 719, 359/708, 566, 565

[56] References Cited

U.S. PATENT DOCUMENTS

| | | |
|---|---|---|
| 5,446,564 | 8/1995 | Komma et al. . |
| 5,446,565 | 8/1995 | Komma et al. . |
| 5,526,338 | 6/1996 | Hasman et al. . |
| 5,703,856 | 12/1997 | Hayashi et al. . |

FOREIGN PATENT DOCUMENTS

| | | |
|---|---|---|
| 747893 | 12/1996 | European Pat. Off. . |
| 865037 | 9/1998 | European Pat. Off. . |
| 7-98431 | 4/1995 | Japan . |

*Primary Examiner*—Scott J. Sugarman
*Attorney, Agent, or Firm*—Greenblum & Bernstein, P.L.C.

[57] ABSTRACT

An objective lens includes a refractive lens having a positive refractive power, and a diffractive lens structure having a plurality of concentric ring-shaped steps that are formed on at least one lens surface of the refractive lens. The objective lens is a biconvex plastic lens having first and second aspherical surfaces. A diffractive lens structure is formed on the first surface of the objective lens. The diffractive lens structure is similar to a Fresnel lens, it is formed as many concentric rings each of which has a wedge sectional shape. The boundary between the adjacent rings is formed as a step giving a predetermined optical path difference. The diffractive lens structure has wavelength dependence such that at least two light beams having different wavelength with an identical diffractive order form appropriate wavefronts for at least two kinds of optical discs respectively provided with cover layers having different thickness.

11 Claims, 14 Drawing Sheets

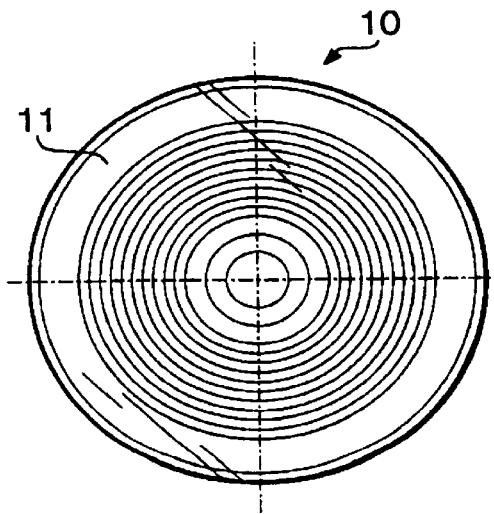
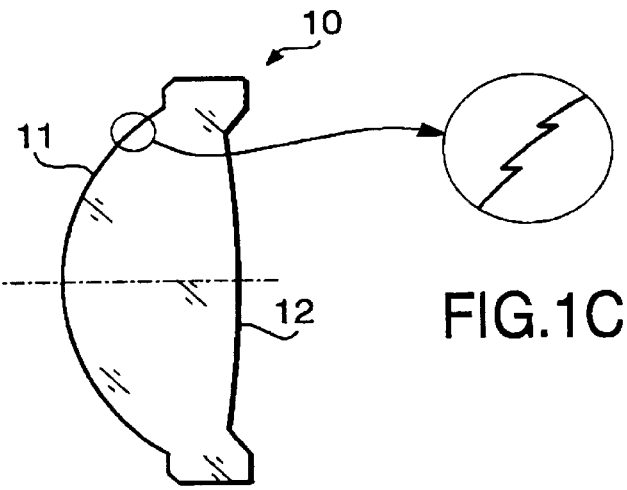
FIG.1A  FIG.1B  FIG.1C
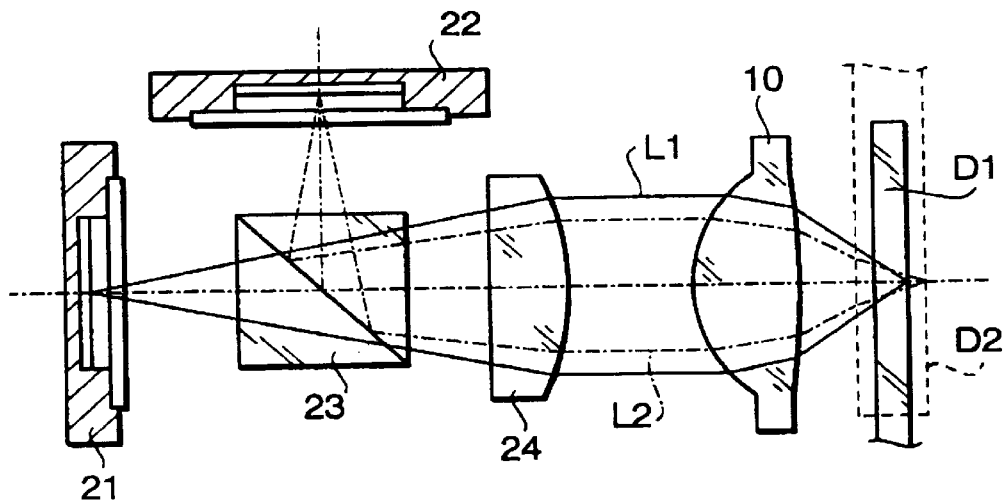
FIG. 2

FIG. 3
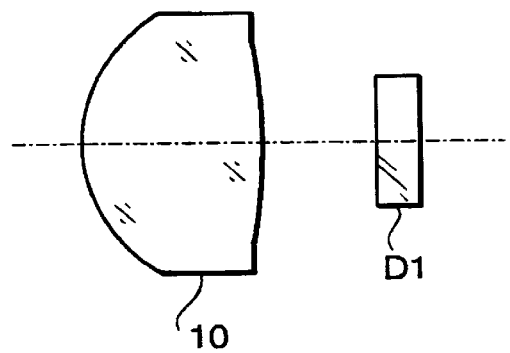
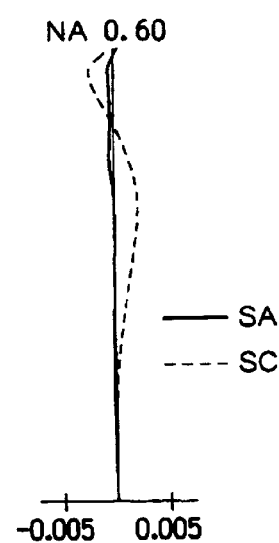
FIG. 4A
NA 0.60
—— SA
---- SC
-0.005  0.005
SPHERICAL ABERRATION
SINE CONDITION
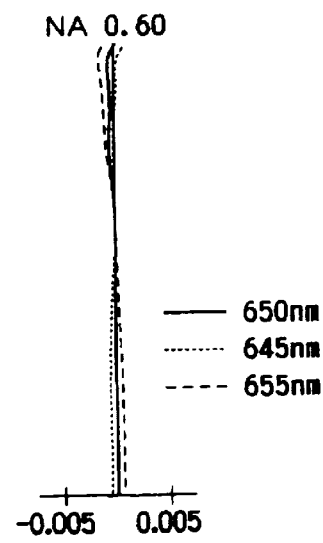
FIG. 4B
NA 0.60
—— 650nm
······ 645nm
---- 655nm
-0.005  0.005
SPHERICAL ABERRATION
CHROMATIC ABERRATION
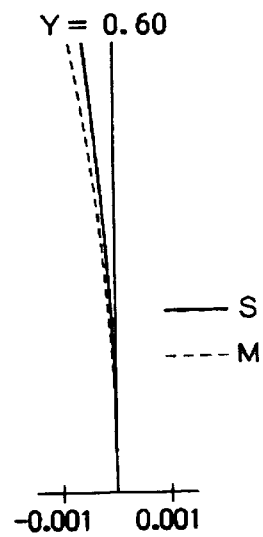
FIG. 4C
Y = 0.60
—— S
---- M
-0.001  0.001
ASTIGMATISM

FIG. 5
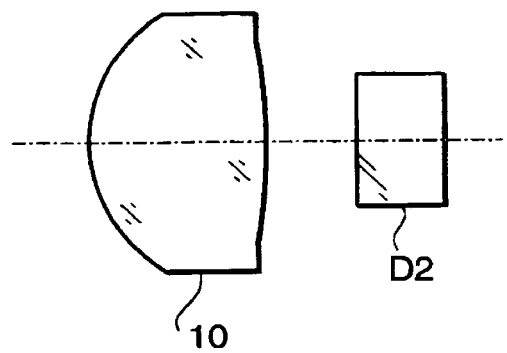
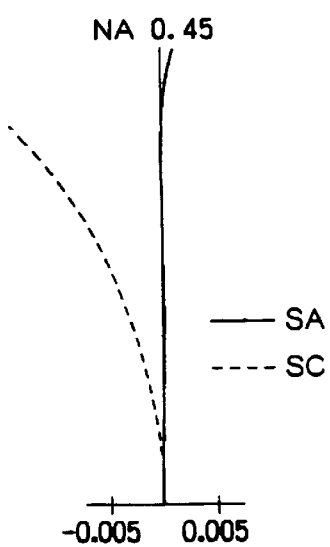
FIG.6A
SPHERICAL ABERRATION
SINE CONDITION
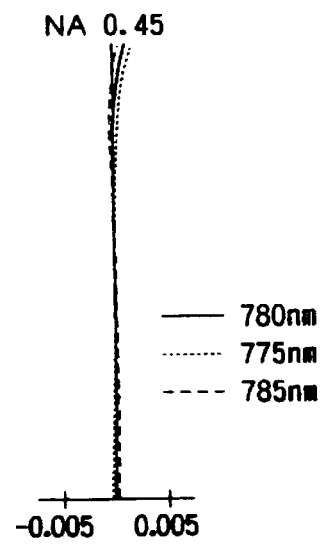
FIG.6B
SPHERICAL ABERRATION
CHROMATIC ABERRATION
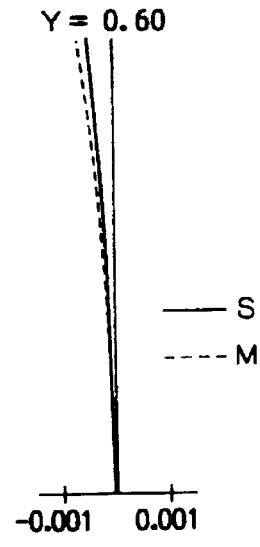
FIG.6C
ASTIGMATISM

FIG. 7
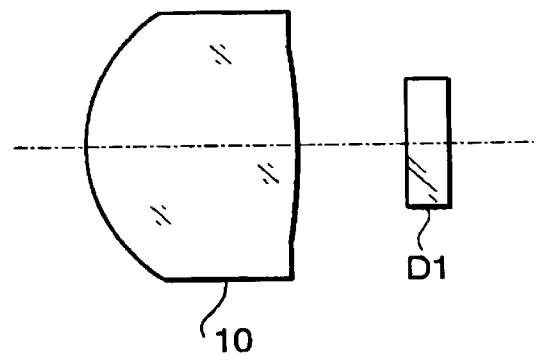
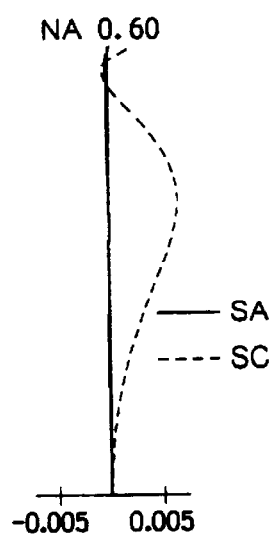
FIG. 8A
SPHERICAL ABERRATION
SINE CONDITION
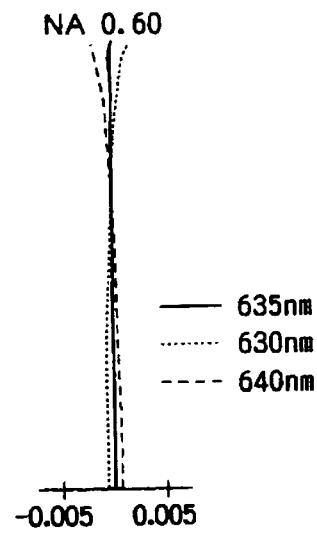
FIG. 8B
SPHERICAL ABERRATION
CHROMATIC ABERRATION
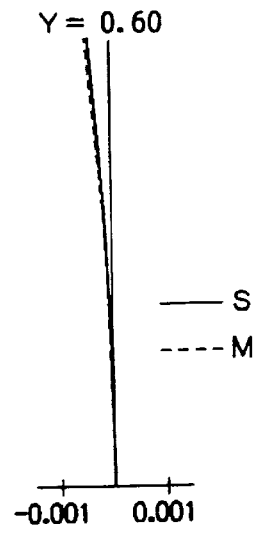
FIG. 8C
ASTIGMATISM FIG. 9
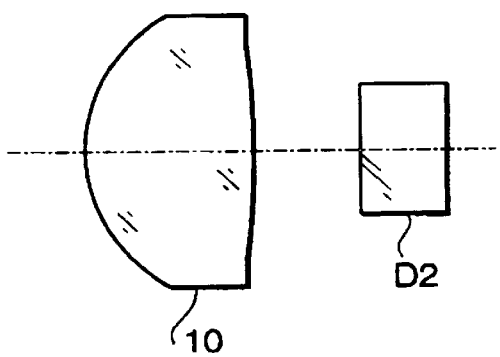
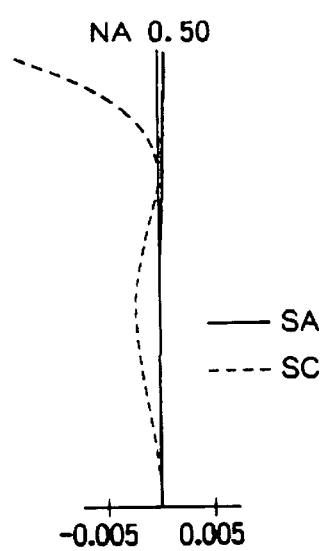
FIG.10A
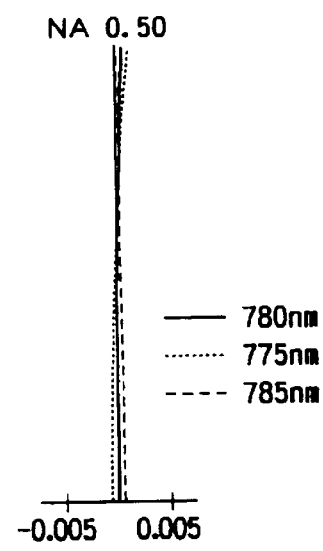
FIG.10B
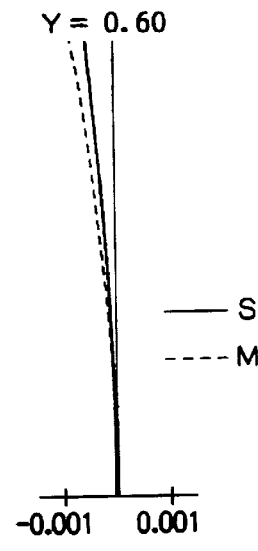
FIG.10C

SPHERICAL ABERRATION
SINE CONDITION

SPHERICAL ABERRATION
CHROMATIC ABERRATION

ASTIGMATISM

SPHERICAL ABERRATION
SINE CONDITION

SPHERICAL ABERRATION
CHROMATIC ABERRATION

ASTIGMATISM

SPHERICAL ABERRATION
SINE CONDITION

SPHERICAL ABERRATION
CHROMATIC ABERRATION

ASTIGMATISM

NA 0.50

— SA
---- SC

SPHERICAL ABERRATION
SINE CONDITION

NA 0.50

— 780nm
······ 775nm
---- 785nm

SPHERICAL ABERRATION
CHROMATIC ABERRATION

Y = 0.60

— S
---- M

ASTIGMATISM

NA 0.60

—— SA
---- SC

-0.005  0.005

SPHERICAL ABERRATION
SINE CONDITION

NA 0.60

—— 650nm
······ 645nm
---- 655nm

-0.005  0.005

SPHERICAL ABERRATION
CHROMATIC ABERRATION

Y = 0.60

—— S
---- M

-0.001  0.001

ASTIGMATISM

SPHERICAL ABERRATION
SINE CONDITION

SPHERICAL ABERRATION
CHROMATIC ABERRATION

ASTIGMATISM

NA 0.60

— SA
--- SC

SPHERICAL ABERRATION
SINE CONDITION

NA 0.60

— 635nm
······ 630nm
--- 640nm

SPHERICAL ABERRATION
CHROMATIC ABERRATION

Y = 0.60

— S
--- M

ASTIGMATISM

SPHERICAL ABERRATION
SINE CONDITION

SPHERICAL ABERRATION
CHROMATIC ABERRATION

ASTIGMATISM

OBJECTIVE LENS FOR OPTICAL PICK-UP

BACKGROUND OF THE INVENTION

The present invention relates to a high NA (numerical aperture) objective lens installed in an optical pick-up of an optical disc apparatus that is able to record/reproduce a plurality of kinds of optical discs whose cover layers have different thickness. Particularly, the present invention relates to the objective lens that has a diffractive lens structure formed on a surface of a refractive lens.

The optical disc includes an information layer on which digital information is recorded, and a transparent cover layer that covers the information layer. A laser beam from the optical pick-up is converged to form a beam spot on the information layer through the cover layer. The distance between the optical pick-up and the information layer varies depending upon the thickness of the cover layer.

Namely, the thicker the cover layer is, the farther the distance to the beam spot from the optical pick-up is. For example, since the cover layer of a compact disc (CD) or that of a CD-R has the thickness of 1.2 mm, and the thickness of the cover layer of a digital versatile disc (DVD) is 0.6 mm, the optical pick-up is required to move the beam spot away from the optical pick-up by 0.6 mm in the cover layer (0.4 mm in air) when the DVD is replaced with the CD or the CD-R.

Although a paraxial beam spot moves as the objective lens is moved, the change of the thickness of the cover layer changes spherical aberration. If the optical pick-up only moves the objective lens when the disc is replaced, wave front aberration of the laser beam is deteriorated, thereby the diameter of the beam spot is increased, which prevents the optical disc apparatus from reproducing the recorded information from the CD. For instance, when the objective lens, which is designed to minimize the spherical aberration when the recorded information is reproduced from the DVD, is used for reproducing the information from the CD, the spherical aberration becomes too large to reproducing the information even if the objective lens moves to bring the beam spot to be coincident with the information layer.

Therefore, there is known, as a prior art, an optical pick-up that adjusts the condition of the laser beam entering into the objective lens according to the thickness of the cover layer.

For example, Japanese Provisional Patent Publication No. Hei 7-98431 discloses such an optical pick-up. The optical system shown in this publication employs a holographic lens on the laser source side of the objective lens to divide the laser beam from the laser source into a zero order parallel diffractive beam and a first order divergent diffractive beam. The zero order diffractive beam is used for the optical disc having a thinner cover layer (i.e., the DVD), the first order diffractive beam is used for the optical disc having a thicker cover layer (i.e., the CD and CD-R). The optical pick-up of the publication enables to form the diffraction-limited beam spots for the respective optical discs when the holographic lens is designed to obtain the most suitable laser beams according to the thickness of the cover layers.

However, since the optical pick-up of the publication always divides the laser beam from the laser source into the zero and first order diffractive beams, and only one of these beams is used for recording/reproducing information at a time, the maximum efficiency in use of the light quantity is not more than 40%.

Further, when one of the diffractive beams is being used for recording/reproducing the information, the other diffractive beam is an unnecessary beam, which increases noises.

Still further, the recording density of the DVD is higher than that of the CD, which requires the optical pick-up for the DVD to form a smaller beam spot than the optical pick-up designed for the exclusive use of the CD (hereinafter referred as an exclusive CD pick-up). Since the diameter of the beam spot has a positive correlation with the wavelength of the laser beam, the optical pick-up for the DVD requires the laser source whose oscillation wavelength is 635 through 665 nm that is shorter than the oscillation wavelength of the exclusive CD pick-up (i.e., 780 through 830 nm). On the other hand, the reflection characteristics of the CD-R requires the laser source whose oscillation wavelength is about 780 nm.

Accordingly, when the optical pick-up having a single laser source as described in the publication employs a laser source that emits a laser beam having a shorter oscillation wavelength, it cannot reproduce the information from the CD-R.

SUMMARY OF THE INVENTION

It is therefore an object of the present invention to provide an objective lens for an optical pick-up, which is capable of recording/reproducing information on a plurality of kinds-of the optical discs (e.g., CD, CD-R and DVD) of which the cover layers are different in the thickness. Further, the present invention is aimed to provide the objective lens that has higher efficiency in use of the light quantity than the conventional optical pick-up as disclosed in the above-identified publication.

For the above object, according to the present invention, there is provided an improved objective lens for an optical pick-up, which includes a refractive lens having a positive refractive power, and a diffractive lens structure having a plurality of concentric ring-shaped steps that are formed on at least one lens surface of the refractive lens. The diffractive lens structure has wavelength dependence such that at least two light beams having different wavelength with an identical diffractive order form appropriate wavefronts for at least two kinds of optical discs respectively provided with cover layers having different thickness.

Namely, the predetermined order diffractive light beam forms the appropriate wavefront for the optical disc having a predetermined thickness cover layer at the predetermined wavelength, and forms the appropriate wavefront for the optical disc having a different thickness cover layer at the different wavelength.

With this construction, a change of the wavelength of the laser beam corresponding to the thickness of the cover layer of the optical disc causes the predetermined order diffractive light to converge onto each of the information layers with forming of an appropriate spot.

Further, the diffractive lens structure is preferable to having a wavelength dependence such that a short wavelength diffractive light forms an appropriate wavefront for an optical disc having a thinner cover and a long wavelength diffractive light forms an appropriate wavefront for an optical disc having a thicker cover layer. More particularly, the diffractive lens structure may change spherical aberration in the undercorrected direction as wavelength of incident light increases.

As described above, the spherical aberration varies in the overcorrected direction as the thickness of the cover layer increases. Therefore, when a longer wavelength laser source is used for an optical disc having a thicker cover layer, and a shorter wavelength laser source is used for an optical disc having a thinner cover layer, the change of the spherical aberration due to change of the cover layer's thickness is corrected by the above-mentioned wavelength dependence of the diffractive lens structure.

An additional optical path length added by a diffractive lens structure is expressed by the following optical path difference function $\Phi(h)$:

$$\Phi(h) = (P_2 h^2 + P_4 h^4 + P_6 h^6 + \ldots) \times \lambda$$

where $P_2$, $P_4$ and $P_6$ are diffractive coefficients of second, fourth and sixth orders, h is a height from the optical axis and $\lambda$ is wavelength of incident light.

The objective lens according to the present invention may satisfy the following condition (1);

$$-15 < \Phi(h_{45})/\lambda - P_2 \times (h_{45})^2 < -7 \quad (1)$$

where $h_{45}$ is the height from the optical axis of a point where a light ray whose NA is 0.45 intersects the diffractive lens structure.

Further, it is desirable for the refractive lens and the diffractive lens structure to have total longitudinal chromatic aberration such that the backfocus increases as the wavelength of the incident light increases. In such a case, it is advisable that the following condition (2) is satisfied;

$$-0.8 < \Delta CA/\Delta SA < -0.2 \quad (2)$$

where $\Delta CA$ is a movement of a paraxial focal point with shift of wavelength and $\Delta SA$ is a variation of spherical aberration for marginal rays with the shift of wavelength.

The diffractive lens structure of the objective lens according to the present invention may have a small paraxial power, and it is desirable to satisfy the following condition (3);

$$-0.020 < f/f_D < 0.020 \quad (3)$$

where $f_D$ is the focal length of the diffractive lens structure that is defined as the following equation;

$$f_D = 1/(-P_2 \times 2\lambda).$$

When the optical discs includes at least two kinds of optical discs whose cover layers have 1.2 mm and 0.6 mm in thickness, the following condition (4) is desirable to be satisfied;

$$0.75 < \lambda_1/\lambda_2 < 0.87 \quad (4)$$

where $\lambda_1$ is wavelength of the light for the optical disc having the 0.6 mm cover layer, and $\lambda_2$ is wavelength of the light for the optical disc having the 1.2 mm cover layer.

Still further, the blazed wavelength $\lambda_B$ of the diffractive lens structure in the center region around the optical axis may satisfy a condition of $\lambda_1 < \lambda_B < \lambda_2$ and the following conditions (5) and (6);

$$0.87 < \lambda_B/\lambda_2, \quad (5)$$

$$\lambda_B/\lambda_1 < 1.13. \quad (6)$$

The blazed wavelength of the diffractive lens structure in the peripheral region may be shorter than the blazed wavelength $\lambda_B$ of the diffractive lens structure in the center region. Alternatively, peripheral region of the lens surface on which the diffractive lens structure is formed may be a continuous surface without steps. The peripheral region is defined as a region where a height from the optical axis falls in the range of about 85% through 100% of the effective radius of the refractive lens. It should be noted that the diffractive lens structure blazed for the shorter wavelength or the aberration-compensated continuous surface for the shorter wavelength may be formed inside the peripheral region.

DESCRIPTION OF THE ACCOMPANYING DRAWINGS

FIG. 1A is a front view of an objective lens according to embodiments;

FIG. 1B is a vertical cross-sectional view of an objective lens according to the embodiments;

FIG. 1C is an enlarged view of FIG. 1B;

FIG. 2 shows an optical system of an optical pick-up on which the objective lens according to the embodiments is mounted;

FIG. 3 is a lens diagram of the objective lens according to a first embodiment with a cover layer of a thin cover type optical disc such as a DVD;

FIGS. 4A, 4B and 4C are graphs showing various aberrations of the objective lens according to the first embodiment when the thin cover type optical disc is used;

FIG. 5 is a lens diagram of the objective lens according to the first embodiment with a cover layer of a thick cover type optical disc such as a CD or a CD-R;

FIGS. 6A, 6B and 6C are graphs showing various aberrations of the objective lens according to the first embodiment when the thick cover type optical disc is used;

FIG. 7 is a lens diagram of the objective lens according to a second embodiment with the cover layer of the thin cover type optical disc;

FIGS. 8A, 8B and 8C are graphs showing various aberrations of the objective lens according to the second embodiment when the thin cover type optical disc is used;

FIG. 9 is a lens diagram of the objective lens according to the second embodiment with the cover layer of the thick cover type optical disc;

FIGS. 10A, 10B and 10C are graphs showing various aberrations of the objective lens according to the second embodiment when the thick cover type optical disc is used;

DESCRIPTION OF THE EMBODIMENTS

Figure 11:
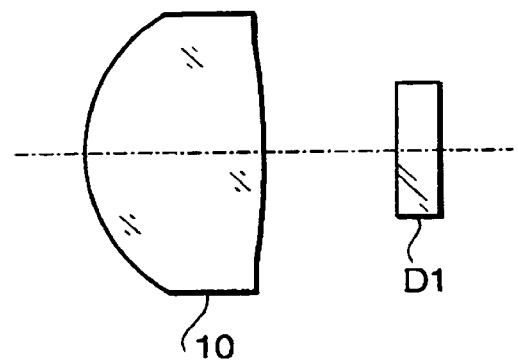
FIG. 11 is a lens diagram of the objective lens according to a third embodiment with the cover layer of the thin cover type optical disc.

FIGS. 1A, 1B and 1C show an objective lens 10 according to embodiments: FIG. 1A is a front view; FIG. 1B is a vertical cross-sectional view; and FIG. 1C is an enlarged side view of FIG. 1B. The objective lens 10 is applied to an optical pick-up of an optical disc apparatus that is capable of recording/reproducing a plurality of kinds of optical discs (e.g., CD, CD-R and DVD) provided with cover layers having different thickness. The objective lens 10 converges incident light emitted from a light source (i.e., a semiconductor laser) onto an information layer through the cover layer of the optical disc.

The objective lens 10 is a biconvex plastic lens having first and second aspherical surfaces 11 and 12. A diffractive lens structure is formed on the first surface 11 of the objective lens 10. The diffractive lens structure is formed, similar to a Fresnel lens, as a large number of concentric rings each of which has a wedge sectional shape. Each of the boundaries between the adjacent rings is formed as a step giving a predetermined optical path difference.

FIG. 2 shows an optical system of the optical pick-up on which the objective lens 10 is installed. The optical system includes a DVD module 21, a CD module 22, a beam combiner 23, a collimator lens 24 and the objective lens 10. Each of the modules 21 and 22 is provided with a semiconductor laser and a sensor that are mounted on a common substrate. The objective lens 10 is mounted on a focus adjusting mechanism to adjust the lens position corresponding to the position of the information layer of the optical disc.

The DVD is a thin cover type optical disc. The thickness of the cover layer of the DVD is 0.6 mm. In order to form a fine beam spot on the DVD, a laser beam whose wavelength is within a range of 635 nm through 665 nm is required. On the other hand, the CD-R and the CD are thick cover type optical discs. The thickness of the cover layer of the CD-R or the CD is 1.2 mm. The CD-R requires a laser beam of about 780 nm wavelength due to its spectral reflectance.

Therefore, a semiconductor laser of the DVD module 21 emits the laser beam of 635 nm or 650 nm wavelength, a semiconductor laser of the CD module 22 emits the laser beam of 780 nm wavelength.

The laser beam emitted from the semiconductor laser converges onto the information layer through the cover layer D1(shown by a solid line) or D2(shown by a dotted line).

When the thin cover type optical disc having the thin cover layer D1 is used, the DVD module 21 is operated to emit the laser beam L1(shown by a solid line). The laser beam L1 is converged onto the information layer of the thin cover type optical disc through the thin cover layer D1. When the thick cover type optical disc having the thick cover layer D2 is used, the CD module 22 is operated to emit the laser beam L2(shown by a dotted line). The laser beam L2 is converged onto the information layer of the thick cover type optical disc through the thick cover layer D2.

The diffractive lens structure has wavelength dependence such that a predetermined order diffractive light, which is a first order diffractive light in the embodiments, forms an appropriate wavefront for the thin cover type optical disc at a wavelength of 635 nm or 650 nm, and forms an appropriate wavefront for the thick cover type optical disc at a wavelength of 780 nm. In the embodiments, the diffractive lens structure has a wavelength dependence such that spherical aberration changes in the undercorrected direction as wavelength of incident light increases.

The spherical aberration changes in the overcorrected direction as the thickness of the cover layer increases. Further, the diffractive lens structure changes the spherical aberration in the undercorrected direction as the wavelength of the incident laser beam increases. And thus, since a longer wavelength laser beam is used for the thick cover type optical disc, and a shorter wavelength laser beam is used for the thin cover type optical disc, the change of the spherical aberration due to change of the cover layer's thickness is corrected by the change of the spherical aberration due to the wavelength dependence of the diffractive lens structure.

An additional optical path length added by a diffractive lens structure is expressed by the following optical path difference function $\Phi(h)$:

$$\Phi(h) = (P_2 h^2 + P_4 h^4 + P_6 h^6 + \ldots) \times \lambda$$

where $P_2$, $P_4$ and $P_6$ are coefficients of second, fourth and sixth orders, h is a height from the optical axis and $\lambda$ is a wavelength of incident light. The function $\Phi(h)$ represents an optical path difference between an imaginary ray that is assumed not to be diffracted by the grating and a ray that is diffracted by the grating, at a point on the diffractive lens structure where the height from the optical axis is h. In such an expression, a negative value of the second order coefficient $P_2$ represents a positive paraxial power of the diffractive lens structure. Further, the negative power increases with increasing the distance from the optical axis when the fourth order coefficient $P_4$ is larger than zero.

An actual microscopic shape of the diffractive lens structure is defined like a Fresnel lens having a large number of concentric rings. The actual shape $\Phi'(h)$ is defined by subtracting $\lambda \times m$ (m: integer) from $\Phi(h)$ as follows.

$$\Phi'(h)=(MOD(P_2h^2+P_4h^4+\ldots+C, 1)\times\lambda_B$$

Symbol $\lambda_B$ is a blazed wavelength for which the steps of the grating gives an optical path difference by one wavelength, and the diffractive efficiency becomes the maximum at the blazed wavelength $\lambda_B$. Symbol C is a constant defining a phase at a boundary between adjacent rings ($0<C\leq 1$). The function $MOD(x, y)$ represents the remainder when x is divided by y. $MOD(P_2h^2+P_4h^4+\ldots+C, 1)$ is equal to zero at the boundary. The diffractive lens structure is formed on the base curve that is the lens surface of the refractive lens. Inclines and steps of the ring areas are designed such that the optical path differences are defined by $\Phi'(h)$.

The objective lens 10 satisfies the following condition (1)

$$-15<\Phi(h_{45})/\lambda-P_2\times(h_{45})^2<-7 \qquad (1)$$

where $h_{45}$ is the height from the optical axis of a point where a light ray whose NA is 0.45 intersects the diffractive lens structure.

When the condition (1) is satisfied, the variation of the spherical aberration due to change of the cover layer's thickness can be effectively counterbalanced by the variation of the spherical aberration of the diffractive lens structure due to the wavelength change. If the intermediate term of the condition (1) becomes lower than −15, the variation of the spherical aberration due to shift of wavelength becomes too large. Since the wavelength of the laser beam emitted by the semiconductor laser has a tolerance of about ±5 nm due to an individual difference, if the variation of the spherical aberration is relatively large with respect to the change of the wavelength, it becomes impossible to use a semiconductor laser emitting a laser beam whose wavelength is different from the standard wavelength. This requires selection of the semiconductor lasers, which decreases productivity. To avoid the above situation, the compensation effect of the spherical aberration by the diffractive lens structure is, therefore, desirable to be slightly less than sufficient.

On the other hand, when the intermediate term of the condition (1) exceeds −7, the variation of the spherical aberration due to shift of wavelength becomes too small, which cannot counterbalance the variation of the spherical aberration due to the change of the cover layer's thickness. Further, the most suitable value of the intermediate term of the condition (1) is about −11 when the 635 through 665 nm wavelength laser beam is used for the thin cover type optical disc and the 780 nm wavelength laser beam is used for the thick cover type optical disc.

The shift of wavelength of the laser due to the change of temperature causes the backfocus of the objective lens to change, which causes focus error. Since the change of backfocus due to temperature change are very slow, the focus error can be corrected by the focus adjusting mechanism in the optical pick-up.

On the other hand, the wavelength of the laser is rapidly changed by switching of the laser output between high and low levels during recording operation. The rapid shift of wavelength also causes the focus error, and it cannot be perfectly corrected by the focus adjusting mechanism. Thus, it is desirable that the objective lens 10 is constituted such that movement of the focal point is reduced.

The movement of the focal point may be reduced by correcting longitudinal chromatic aberration in general. However, since the objective lens of the embodiment has the wavelength dependence in the spherical aberration, the perfect correction in the longitudinal chromatic aberration, on the contrary, increases the movement of the best focus position. Thus the correction of the chromatic aberration should be balanced with the variation of the spherical aberration due to shift-of wavelength.

For the purpose, the refractive lens and the diffractive lens structure of the embodiment have total longitudinal chromatic aberration such that the backfocus increases as the wavelength of the incident light increases, and the following condition (2) is satisfied, $$-0.8<\Delta CA/\Delta SA<-0.2 \qquad (2)$$

where $\Delta CA$ is a movement of a paraxial focal point with shift of wavelength and $\Delta SA$ is a variation of spherical aberration for marginal rays with the shift of wavelength.

When the condition (2) is satisfied, increasing of the wavelength moves the paraxial focal point away from the lens and moves the focal point by the marginal rays closer to the lens. If the spherical aberration is almost corrected at the standard wavelength $\lambda_0$, the paraxial focal point at the increased wavelength $\lambda_3$ ($>\lambda_0$) is farther from the lens than the paraxial focal point at the standard wavelength $\lambda_0$ and the focal point by the marginal rays at the increased wavelength $\lambda_3$ is closer to the lens than the paraxial focal point at the standard wavelength $\lambda_0$. Therefore, the movement of the best focus position, which is an average from the paraxial focal point to the focal point by the marginal rays, can be reduced.

Further, the objective lens 10 satisfies the following condition (3) to reduce the movement of the best focus position due to rapid shift of wavelength.

$$-0.020<f/f_D<0.020 \qquad (3)$$

where $f_D$ is the focal length of the diffractive lens structure that is defined as the following equation;

$$f_D=1/(-P_2\times 2\lambda).$$

The condition (3) defines the compensation effect for the longitudinal chromatic aberration. It is known that a value corresponding to Abbe number for a diffractive lens is equal to −3.453. The negative sign of the value reflects the opposite sense of the dispersion when compared with that of refractive lenses, and its low magnitude is an indication of the large dispersion. Therefore, a use of a diffractive lens structure having small power in association with the refractive lens compensates the chromatic aberration.

When the condition (3) is satisfied, the movement of the best focus position due to rapid shift of wavelength can be reduced while keeping the compensation effect for the spherical aberration due to the change of the cover layer's thickness.

The wavelengths of the laser beam are selected so as to satisfy the following condition (4);

$$0.75<\lambda_1/\lambda_2<0.87 \qquad (4)$$

where $\lambda_1$ is wavelength of the laser beam for the thin cover type optical disc, and $\lambda_2$ is wavelength of the laser beam for the thick cover type optical disc.

When the condition (4) is satisfied, the diffractive lens structure sufficiently changes the spherical aberration due to the shift of wavelength. The ratio of the wavelengths $\lambda_1$ and $\lambda_2$ represents amount of the wavefront aberration caused by the one step of the diffractive lens structure. For example, when $\lambda_1$ is 650 nm, $\lambda_2$ is 780 nm and the amount of the wavefront aberration at 650 nm is considered as the standard value, the wavefront aberration of (780−650)/780=0.1666 λ is added to the standard value per one step at 780 nm. If the ratio of the condition (4) is larger than 0.87, a number of steps of the diffractive lens structure increases in order to obtain a predetermined wavefront aberration with loss of light amount at the edge of the steps. Further, the variation of the spherical aberration with the shift of wavelength becomes too large, which prohibits the use of a semiconductor laser whose laser wavelength is different from the standard wavelength.

On the other side, when the ratio $\lambda_1/\lambda_2$ smaller than 0.75, the difference between these wavelengths becomes too large, the averaged diffractive efficiency becomes too small.

The blazed wavelength $\lambda_B$ at which the maximum diffractive efficiency is obtained is selected at the time of the design of the microscopic construction of the diffractive lens structure. The blazed wavelength $\lambda_B$ of the diffractive lens structure in the center region around the optical axis satisfies a condition of $\lambda_1<\lambda_B<\lambda_2$ in order to keep a high average diffractive efficiency. With this condition, for example, when $\lambda_1$ is 635 nm and $\lambda_2$ is 780 nm, the diffractive efficiencies at $\lambda_1$ and $\lambda_2$ are more than about 90%, even if the blazed wavelength $\lambda_B$ is set at any wavelength between $\lambda_1$ and $\lambda_2$.

Figure 27:
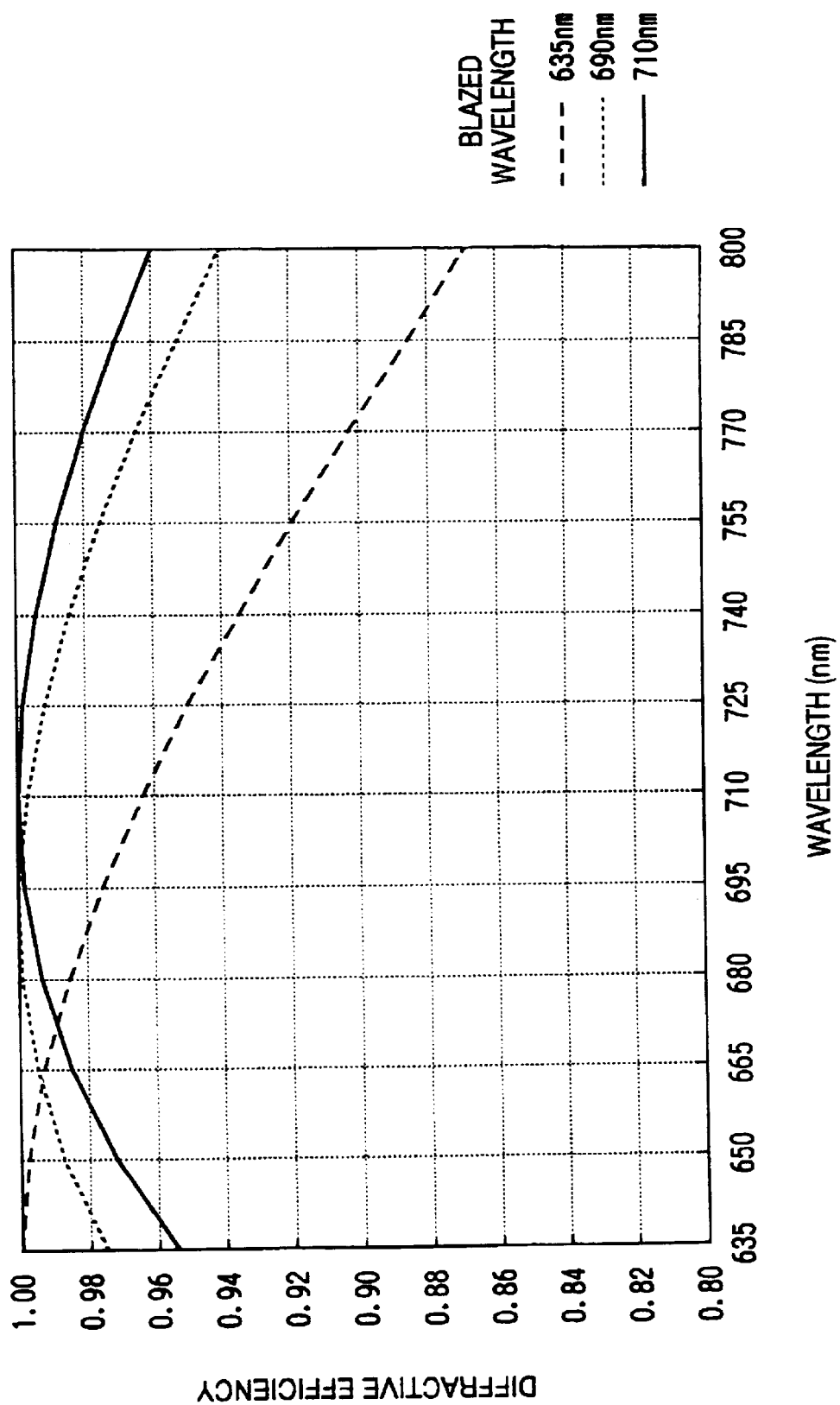
FIG. 27 is a graph showing relationship between diffractive efficiency and wavelength.

FIG. 27 is a graph showing the diffractive efficiencies when the blazed wavelength is set at 635 nm, 690 nm or 710 nm. In any cases, the diffractive efficiencies at 635 nm and 780 nm are larger than about 90%. This shows sufficiently larger values as compared with 40% in the optical system disclosed in the Japanese Provisional Patent Publication No. HEI 7-98431.

Still further, the objective lens 10 of the embodiments satisfies the following conditions (5) and (6) to further increase the diffractive efficiency.

$$0.87<\lambda_B/\lambda_2, \quad (5)$$

$$\lambda_B/\lambda_1<1.13. \quad (6)$$

When the blazed wavelength $\lambda_B$ is close to one of the wavelengths at $\lambda_1$ and $\lambda_2$, the diffractive efficiency at the farther wavelength from the blazed wavelength $\lambda_B$ decreases. When the conditions (5) and (6) are satisfied, the diffractive efficiency becomes about 95% or more at both of the wavelengths $\lambda_1$ and $\lambda_2$.

The blazed wavelength of the diffractive lens structure in the peripheral region is shorter than the blazed wavelength $\lambda_B$ of the diffractive lens structure in the center region. Alternatively, peripheral region of the lens surface, on which the diffractive lens structure is formed, is formed as a continuous surface without steps. The peripheral region is defined as a region where a height from the optical axis falls in the range of 85% through 100% of the effective radius of the refractive lens.

The DVD requires NA of 0.60, while NA of 0.50 is enough for the CD or CD-R. The laser beam outside the NA of 0.50 has, on the contrary, a bad influence on the reproducing of the CD or CD-R. The laser beam having 0.6 in NA forms a too small beam spot for the CD or CD-R. Therefore, the peripheral region is desirable to be an exclusive use of the DVD. When the blazed wavelength of the peripheral region is shorter than the center portion, the diffractive efficiency for the CD or CD-R decreases and that for DVD increases. When the peripheral region is the continuous surface where the aberration is corrected for the DVD, the peripheral region operates to converge the laser beam for the DVD.

Still further, spherical aberration of a positive refractive lens varies in the overcorrected direction as temperature rises due to decreasing of the refractive index, and the semiconductor laser has temperature dependence such that wavelength of the emitted laser increases as temperature rises. When the temperature rises, the refractive lens changes the spherical aberration in the overcorrected direction, and the diffractive lens structure changes the spherical aberration in the undercorrected direction because the wavelength of the light emitted from the semiconductor laser increases. Thus the changes of the spherical aberrations caused by the refractive lens and the diffractive lens structure can be counterbalanced to each other.

Therefore, when the objective lens 10 is made from resin whose refractive index decreases as temperature increases, the diffractive lens structure is desirable to be formed in the peripheral region as well as in the center region. In such a case, the diffractive lens structure in the peripheral region is desirable to have shorter blazed wavelength than that in the center region in order to increases the diffractive efficiency of the laser beam for the DVD.

Six embodiments according to the above mentioned construction will be described hereinafter. The objective lens 10 of the embodiments are designed for the compatible optical pick-up for both of the thin cover type optical disc having 0.6 mm thickness cover layer such as a DVD and the thick cover type optical disc having 1.2 mm thickness cover layer such as a CD or a CD-R. The diffractive lens structure is formed on the first surface in the first, second, third and fourth embodiments, and is formed on the second surface in the fifth and sixth embodiments.

EMBODIMENT 1

FIG. 3 shows the objective lens 10 of the first embodiment and the cover layer $D_1$ Of the thin cover type optical disc. FIG. 5 shows the objective lens 10 with the cover layer $D_2$ of the thick cover type optical disc. The numerical constructions thereof are described in TABLE 1. The surfaces #1 and #2 represent the objective lens 10 and the surfaces #3 and #4 represent the cover layer of the optical disc.

In TABLE 1, NA denotes numerical aperture, f (unit:mm) denotes the total focal length, $f_D$ (unit:mm) denotes focal length of the diffractive lens structure, ω (unit:degree) denotes half angle of view, $\lambda_1$ (unit:nm) denotes the wavelength for the thin cover type optical disc, $\lambda_2$ (unit:nm) denotes the wavelength for the thick cover type optical disc, $\lambda_B$ (unit:nm) denotes a blazed wavelength, $h_{45}$ (unit:mm) denotes the height from the optical axis of a point where a light ray of which NA is 0.45 intersects the diffractive lens structure, r (unit:mm) denotes a radius of curvature of a surface (the values at the vertex for aspherical surface), $d_1$ (unit:mm) denotes a distance between the surfaces along the optical axis for the thin cover type optical disc, $d_2$ (unit:mm) denotes the distance for the thick cover type optical disc, nμ denotes a refractive index at a wavelength λ nm and vd denotes an Abbe number.

The base curve of the first surface 11 (surface #1) is aspherical. The base curve is defined as a shape of the refractive lens that does not include the diffractive lens structure. The second surface 12 (surface #2) is also an aspherical surface. An aspherical surface is expressed by the following equation:

$$X(h) = \frac{h^2 c}{1+\sqrt{1-(1+K)h^2c^2}} +$$
$$A_4h^4 + A_6h^6 + A_8h^8 + A_{10}h^{10} + A_{12}h^{12}$$

X(h) is a SAG, that is, a distance of a curve from a tangential plane at a point on the surface where the height from the optical axis is h. Symbol c is a curvature (1/r) of the vertex of the surface, K is a conic constant, $A_4$, $A_6$, $A_8$, $A_{10}$ and $A_{12}$ are aspherical surface coefficients of fourth, sixth, eighth, tenth and twelfth orders. The constant K and coefficients $A_4$ through $A_{12}$ of the first and second surfaces of the objective lens 10 are shown in the following TABLE 2.

Further, TABLE 2 indicates coefficients of second, fourth, sixth, eighth and tenth orders $P_2$, $P_4$, $P_6$, $P_8$ and $P_{10}$ of the optical path difference function $\Phi(h)$ to define the diffractive lens structure.

TABLE 1

| $\lambda_1$ = | 650 nm | NA 0.60 | f = 3.30 mm | $f_D$ = 330.53 mm | $\omega$ = 1.0° | $h_{45}$ = 1.49 mm (#1) |
|---|---|---|---|---|---|---|
| $\lambda_2$ = | 780 nm | NA 0.45 | f = 3.32 mm | | $\omega$ = 1.0° | |
| $\lambda_B$ = | 710 nm | | | | | |

| Surface Number | r | d1 | d2 | n650 | n780 | vd |
|---|---|---|---|---|---|---|
| #1 | 2.117 | 2.400 | 2.400 | 1.54082 | 1.53677 | 55.6 |
| #2 | −7.254 | 1.592 | 1.222 | | | |
| #3 | ∞ | 0.600 | 1.200 | | | |
| #4 | ∞ | | | | | |

TABLE 2

| | Surface #1 | Surface #2 |
|---|---|---|
| K | −0.4400 | 0.0000 |
| $A_4$ | −0.2560 × $10^{-2}$ | 0.1882 × $10^{-1}$ |
| $A_6$ | −0.847010 × $10^{-3}$ | −0.5235 × $10^{-2}$ |
| $A_8$ | 0.8800 × $10^{-4}$ | 0.3275 × $10^{-3}$ |
| $A_{10}$ | −0.7500 × $10^{-5}$ | 0.3235 × $10^{-4}$ |
| $A_{12}$ | −0.6200 × $10^{-5}$ | 0.0000 |
| $P_2$ | −2.3272 | |
| $P_4$ | −1.5289 | |
| $P_6$ | −5.5184 × $10^{-1}$ | |
| $P_8$ | 1.5292 × $10^{-1}$ | |
| $P_{10}$ | −1.6178 × $10^{-2}$ | |

FIGS. 4A through 4C show third order aberrations of the objective lens according to the first embodiment when the thin cover type optical disc is used at wavelength of 650 nm: FIG. 4A shows spherical aberration SA and sine condition SC at wavelength 650 nm; FIG. 4B shows chromatic aberration represented by spherical aberrations at wavelengths 650 nm, 645 nm and 655 nm; and FIG. 4C shows astigmatism (S: Sagittal, M: Meridional).

The vertical axes in FIGS. 4A and 4B represent the numerical aperture NA, and the vertical axis in FIG. 4C represents image height Y. Unit of the horizontal axis is "mm" in each of FIGS. 4A through 4C. FIGS. 6A, 6B and 6C are graphs that are similar to FIGS. 4A, 4B and 4C when the thick cover type optical disc is used at wavelength of 780 nm.

The spherical aberration is sufficiently corrected at both of 650 nm and 780 nm as shown in FIGS. 4A and 6A.

The paraxial focal point moves such that the backfocus increases as the wavelength of the incident light increases.

The movement of the paraxial focal point ΔCA by +5 nm shift of wavelength is represented by the width between the lower ends of the curves for 650 nm and 655 nm in FIG. 4B. The variation of spherical aberration for marginal rays ΔSA by +5 nm shift of wavelength is represented by the width between the upper end of the curve for 650 nm and the upper end of the parallel translated curve from the curve for 655 nm so that the lower end thereof is moved to the lower end of the curve for 650 nm. Because the ratio of these values satisfies the condition (2), the curves for 650 nm and 655 nm in FIG. 4B intersect the vertical axis, which represents the moving amount of the best focus position due to the rapid shift of wavelength becomes relatively small.

In the above described numerical construction of the first embodiment, the diffractive lens structure, which is blazed for 710 nm, is formed on the first surface within the entire region in an effective radius. On the other hand, the peripheral region may be optimized for the thin cover type optical disc. The objective lens of the first embodiment has the effective radius of 1.98 mm and the focal length of 3.3 mm at NA 0.6. The radius required for the thick cover type optical disk is 1.49 mm and the focal length thereof is 3.32 mm at NA 0.45. Thus, the peripheral region is defined as a region where a height from the optical axis falls in the range of 75.5% through 100% of the effective radius in the first embodiment.

In order to optimize the peripheral region for the thin cover type optical disc, the peripheral region may be formed as the diffractive lens structure blazed for 650 nm or the continuous surface compensated in aberrations for 650 nm. When the peripheral region is formed as the continuous surface, the diffractive lens structure blazed for 710 nm is formed in the center region. The center region includes a center circular portion and first through fifteenth ring-shaped steps. The sixteenth ring covers the peripheral region that is rotationally symmetric aspherical surface defined by the following coefficients in Table 3. The symbol D is a shift amount between the lens surface at the optical axis and that of the peripheral region along the optical axis direction.

TABLE 3

| r = 2.09903 |
|---|
| K = −0.44 |
| $A_4$ = −8.73_$10^{-4}$ |
| $A_6$ = 1.26_$10^{-4}$ |
| $A_8$ = −6.17_$10^{-5}$ |
| $A_{10}$ = 6.67_$10^{-6}$ |
| $A_{12}$ = −6.20_$10^{-6}$ |
| Δ = −0.1923 |

EMBODIMENT 2

FIG. 7 shows the objective lens 10 of the second embodiment and the cover layer $D_1$ of the thin cover type optical disc. FIG. 9 shows the objective lens 10 with the cover layer $D_2$ of the thick cover type optical disc. The numerical construction of the second embodiment is indicated in TABLE 4. TABLE 5 shows conic constants and aspherical surface coefficients for the first and second surfaces, and diffractive coefficients of the diffractive lens structure formed on the first surface.

FIGS. 8A through 8C show various aberrations of the objective lens according to the second embodiment when the thin cover type optical disc is used at wavelength of 635 nm. FIGS. 10A through 10C show various aberrations when the thick cover type optical disc is used at wavelength of 780 nm.

as the diffractive lens structure blazed for 635 nm or the continuous surface compensated in aberrations for 635 nm.

EMBODIMENT 3

Figure 13:
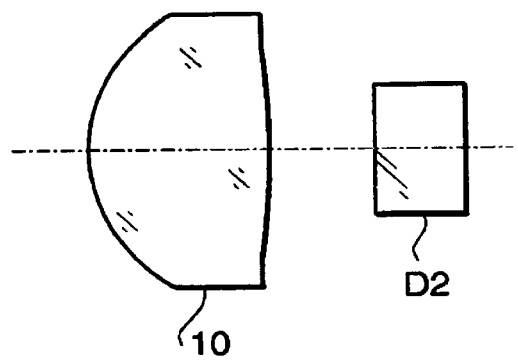
FIG. 13 is a lens diagram of the objective lens according to the third embodiment with the cover layer of the thick cover type optical disc.

FIG. 11 shows the objective lens 10 of the third embodiment and the cover layer $D_1$ of the thin cover type optical disc. FIG. 13 shows the objective lens 10 with the cover layer $D_2$ of the thick cover type optical disc. The numerical construction of the third embodiment is indicated in TABLE 6. TABLE 7 shows conic constants and aspherical surface coefficients for the first and second surfaces, and diffractive coefficients of the diffractive lens structure formed on the first surface.

TABLE 4

| $\lambda_1 =$ | 635 nm | NA 0.60 | f = 3.50 mm | $f_D$ = 350.00 mm | $\omega = 1.0°$ | $h_{45}$ = 1.58 mm (#1) |
|---|---|---|---|---|---|---|
| $\lambda_2 =$ | 780 nm | NA 0.50 | f = 3.52 mm | | $\omega = 1.0°$ | |
| $\lambda_B =$ | 690 nm | | | | | |

| Surface Number | r | d1 | d2 | n650 | n780 | vd |
|---|---|---|---|---|---|---|
| #1 | 2.278 | 2.928 | 2.928 | 1.54142 | 1.53677 | 55.6 |
| #2 | −6.508 | 1.521 | 1.153 | | | |
| #3 | ∞ | 0.600 | 1.200 | | | |
| #4 | ∞ | | | | | |

Figure 12A:
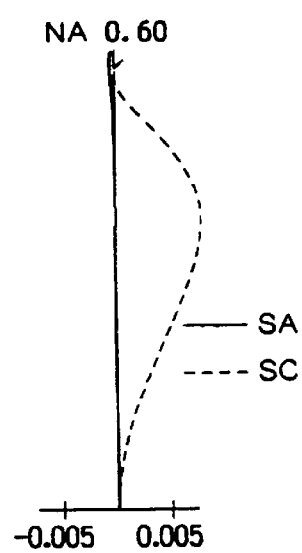
FIGS. 12A, 12B and 12C are graphs showing various aberrations of the objective lens according to the third embodiment when the thin cover type optical disc is used.
Figure 12B:
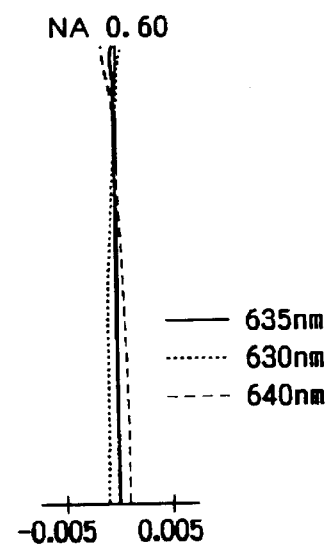
Figure 12C:
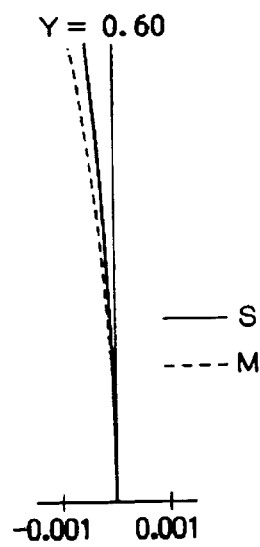
Figure 14A:
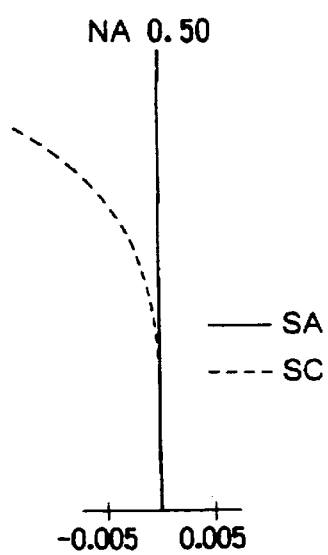
FIGS. 14A, 14B and 14C are graphs showing various aberrations of the objective lens according to the third embodiment when the thick cover type optical disc is used.
Figure 14B:
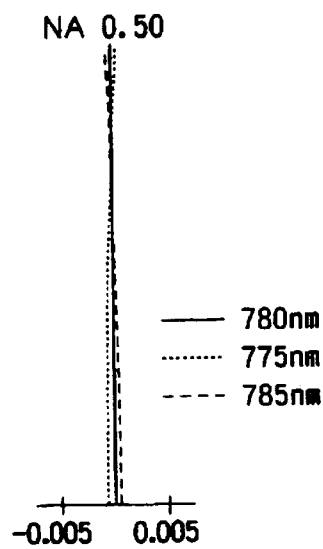
Figure 14C:
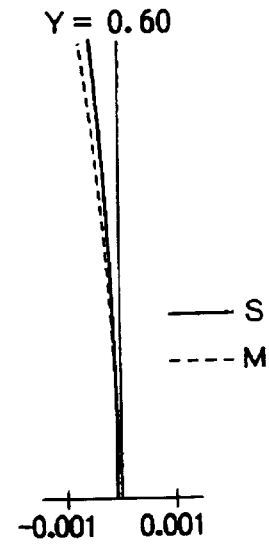

FIGS. 12A through 12C show various aberrations of the objective lens according to the third embodiment when the thin cover type optical disc is used at wavelength of 635 nm. FIGS. 14A through 14C show various aberrations when the thick cover type optical disc is used at wavelength of 780 nm.

TABLE 6

| $\lambda_1 =$ | 635 nm | NA 0.60 | f = 3.50 mm | $f_D = \infty$ | $\omega = 1.0°$ | $h_{45}$ = 1.58 mm (#1) |
|---|---|---|---|---|---|---|
| $\lambda_2 =$ | 780 nm | NA 0.50 | f = 3.53 mm | | $\omega = 1.0°$ | |
| $\lambda_B =$ | 690 nm | | | | | |

TABLE 5

| | Surface #1 | Surface #2 |
|---|---|---|
| K | −0.4400 | 0.0000 |
| $A_4$ | −0.1890 × $10^{-2}$ | 0.2349 × $10^{-1}$ |
| $A_6$ | −0.3510 × $10^{-3}$ | −0.7437 × $10^{-2}$ |
| $A_8$ | 0.8300 × $10^{-5}$ | 0.8432 × $10^{-3}$ |
| $A_{10}$ | −0.1250 × $10^{-5}$ | 0.1949 × $10^{-4}$ |
| $A_{12}$ | −0.3860 × $10^{-5}$ | 0.0000 |
| $P_2$ | −2.2497 | |
| $P_4$ | −1.1709 | |
| $P_6$ | −3.3665 × $10^{-1}$ | |
| $P_8$ | 1.1948 × $10^{-1}$ | |
| $P_{10}$ | −1.9838 × $10^{-2}$ | |

| Surface Number | r | d1 | d2 | n650 | n780 | vd |
|---|---|---|---|---|---|---|
| #1 | 2.203 | 2.400 | 2.400 | 1.54142 | 1.53677 | 55.6 |
| #2 | −8.367 | 1.781 | 1.423 | | | |
| #3 | ∞ | 0.600 | 1.200 | | | |
| #4 | ∞ | | | | | |

TABLE 7

| | Surface #1 | Surface #2 |
|---|---|---|
| K | −0.4400 | 0.0000 |
| $A_4$ | −0.1800 × $10^{-2}$ | 0.1746 × $10^{-1}$ |
| $A_6$ | −0.1500 × $10^{-3}$ | −0.4844 × $10^{-2}$ |
| $A_8$ | −0.9100 × $10^{-5}$ | 0.5863 × $10^{-3}$ |
| $A_{10}$ | 0.1150 × $10^{-4}$ | −0.2529 × $10^{-4}$ |
| $A_{12}$ | −0.3860 × $10^{-5}$ | 0.0000 |
| $P_2$ | 0.0 | |
| $P_4$ | −1.2621 | |
| $P_6$ | −1.4187 × $10^{-1}$ | |
| $P_8$ | 2.27738 × $10^{-2}$ | |
| $P_{10}$ | −5.6149 × $10^{-3}$ | |

In the above described numerical construction of the second embodiment, the diffractive lens structure, which is blazed for 690 nm, is formed on the first surface within the entire region in an effective radius. On the other hand, the peripheral region may be optimized for the thin cover type optical disc. The objective lens of the second embodiment has the effective radius of 2.1 mm and the focal length of 3.5 mm at NA 0.6. The radius required for the thick cover type optical disk is 1.76 mm and the focal length thereof is 3.52 mm at NA 0.50. Thus, the peripheral region is defined as a region where a height from the optical axis falls in the range of 83.8% through 100% of the effective radius in the second embodiment.

In order to optimize the peripheral region for the thin cover type optical disc, the peripheral region may be formed In the above described numerical construction of the third embodiment, the diffractive lens structure, which is blazed for 690 nm, is formed on the first surface within the entire region in an effective radius. On the other hand, the peripheral region may be optimized for the thin cover type optical disc. The objective lens of the third embodiment has the effective radius of 2.1 mm and the focal length of 3.5 mm at NA 0.6. The radius required for the thick cover type optical disk is 1.765 mm and the focal length thereof is 3.55 mm at NA 0.50. Thus, the peripheral region is defined as a region where a height from the optical axis falls in the range of 84.0% through 100% of the effective radius in the third embodiment.

In order to optimize the peripheral region for the thin cover type optical disc, the peripheral region may be formed as the diffractive lens structure blazed for 635 nm or the continuous surface compensated in aberrations for 635 nm.

EMBODIMENT 4

Figure 15:
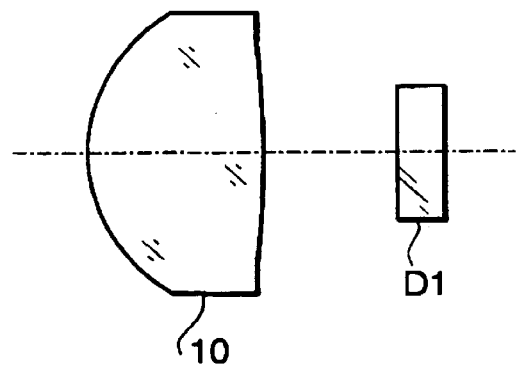
FIG. 15 is a lens diagram of the objective lens according to a fourth embodiment with the cover layer of the thin cover type optical disc.
Figure 17:
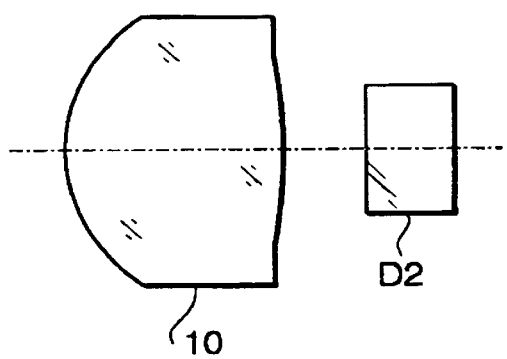
FIG. 17 is a lens diagram of the objective lens according to the fourth embodiment with the cover layer of the thick cover type optical disc.

FIG. 15 shows the objective lens 10 of the fourth embodiment and the cover layer $D_1$ of the thin cover type optical disc. FIG. 17 shows the objective lens 10 with the cover layer $D_2$ of the thick cover type optical disc. The numerical construction of the fourth embodiment is indicated in TABLE 8. TABLE 9 shows conic constants and aspherical surface coefficients for the first and second surfaces, and diffractive coefficients of the diffractive lens structure formed on the first surface.

Figure 16A:
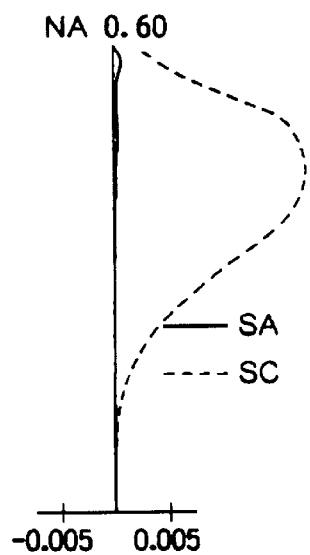
FIGS. 16A, 16B and 16C are graphs showing various aberrations of the objective lens according to the fourth embodiment when the thin cover type optical disc is used.
Figure 16B:
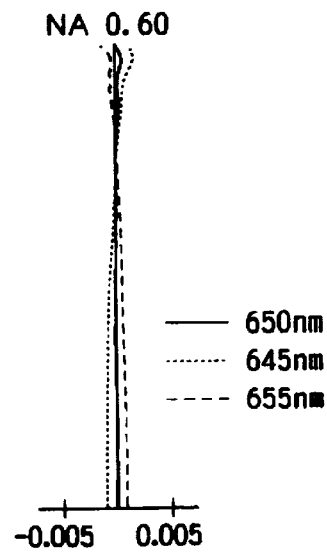
Figure 16C:
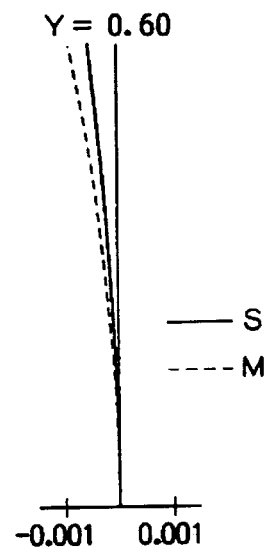
Figure 18A:
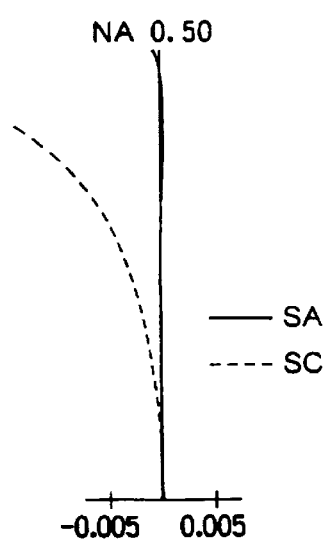
FIGS. 18A, 18B and 18C are graphs showing various aberrations of the objective lens according to the fourth embodiment when the thick cover type optical disc is used.
Figure 18B:
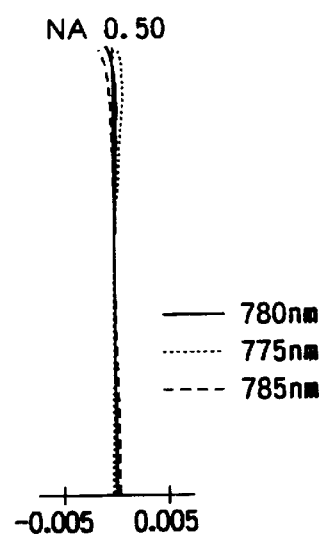
Figure 18C:
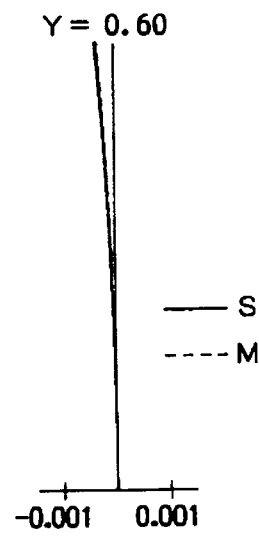

FIGS. 16A through 16C show various aberrations of the objective lens according to the fourth embodiment when the thin cover type optical disc is used at wavelength of 650 nm. FIGS. 18A through 18C show various aberrations when the thick cover type optical disc is used at wavelength of 780 nm.

TABLE 9-continued

|  | Surface #1 | Surface #2 |
|---|---|---|
| $A_6$ | $0.2110 \times 10^{-3}$ | $0.3070 \times 10^{-2}$ |
| $A_8$ | $-0.6630 \times 10^{-4}$ | $-0.3534 \times 10^{-2}$ |
| $A_{10}$ | $0.8400 \times 10^{-5}$ | $0.9045 \times 10^{-3}$ |
| $A_{12}$ | $-0.5800 \times 10^{-5}$ | 0.0000 |
| $P_2$ | 0.0 | |
| $P_4$ | $-1.3766$ | |
| $P_6$ | $-2.0032 \times 10^{-1}$ | |
| $P_8$ | $3.7560 \times 10^{-2}$ | |
| $P_{10}$ | $-1.0539 \times 10^{-3}$ | |

In the above described numerical construction of the fourth embodiment, the diffractive lens structure, which is blazed for 710 nm, is formed on the first surface within the entire region in an effective radius. On the other hand, the peripheral region may be optimized for the thin cover type optical disc. The peripheral region is defined as a region where a height from the optical axis falls in the range of 84.0% through 100% of the effective radius in the fourth embodiment as well as in the third embodiment.

In order to optimize the peripheral region for the thin cover type optical disc, the peripheral region may be formed as the diffractive lens structure blazed for 650 nm or the continuous surface compensated in aberrations for 650 nm.

EMBODIMENT 5

Figure 19:
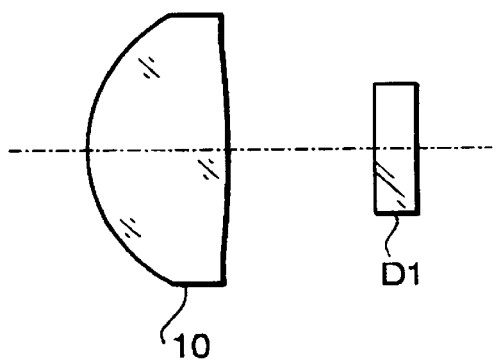
FIG. 19 is a lens diagram of the objective lens according to a fifth embodiment with the cover layer of the thin cover type optical disc.
Figure 21:
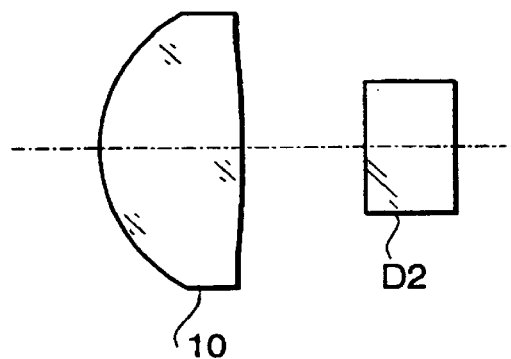
FIG. 21 is a lens diagram of the objective lens according to the fifth embodiment with the cover layer of the thick cover type optical disc.
Figure 22A:
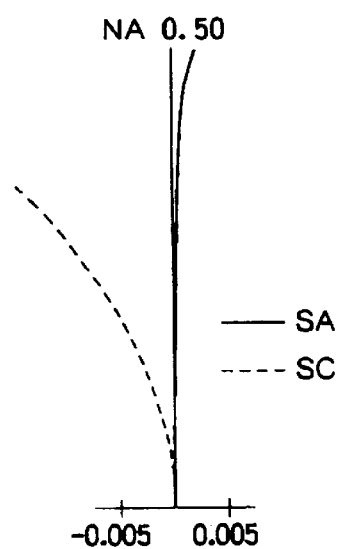
FIGS. 22A, 22B and 22C are graphs showing various aberrations of the objective lens according to the fifth embodiment when the thick cover type optical disc is used.
Figure 22B:
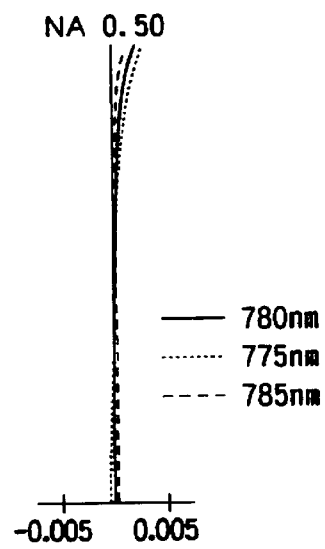
Figure 22C:
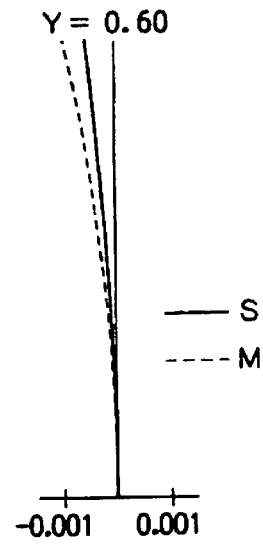

FIG. 19 shows the objective lens 10 of the fifth embodiment and the cover layer $D_1$ of the thin cover type optical disc. FIG. 21 shows the objective lens 10 with the cover layer $D_2$ of the thick cover type optical disc. The numerical construction of the fifth embodiment is indicated in TABLE 10. TABLE 11 shows conic constants and aspherical surface coefficients for the first and second surfaces, and diffractive coefficients of the diffractive lens structure formed on the second surface.

Figure 20A:
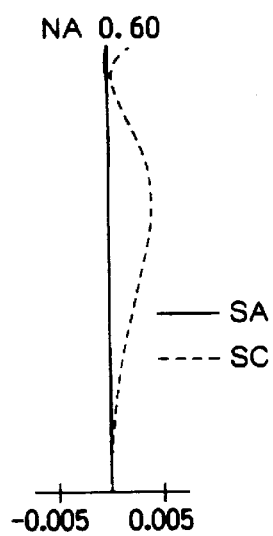
FIGS. 20A, 20B and 20C are graphs showing various aberrations of the objective lens according to the fifth embodiment when the thin cover type optical disc is used.
Figure 20B:
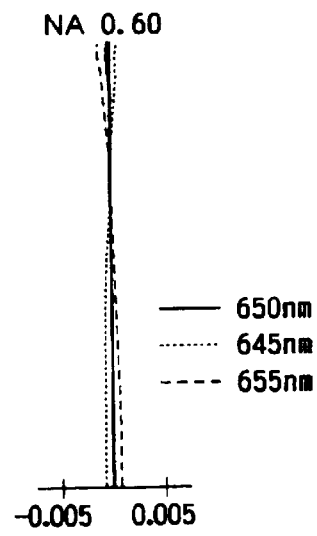
Figure 20C:
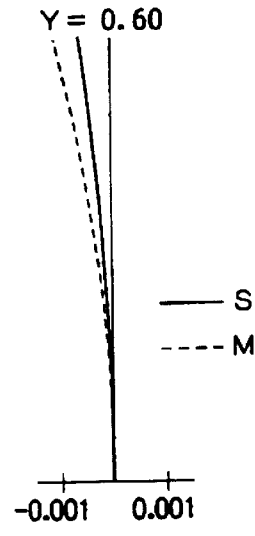

FIGS. 20A through 20C show various aberrations of the objective lens according to the fifth embodiment when the thin cover type optical disc is used at wavelength of 635 nm. FIGS. 21A through 21C show various aberrations when the thick cover type optical disc is used at wavelength of 780 nm.

TABLE 8

| $\lambda_1 = 650$ nm  NA 0.60 | f = 3.50 mm  $f_D = \infty$ | $\omega = 1.0°$ | $h_{45} = 1.58$ mm (#1) |
|---|---|---|---|
| $\lambda_2 = 780$ nm  NA 0.50 | f = 3.53 mm | $\omega = 1.0°$ | |
| $\lambda_B = 710$ nm | | | |

| Surface Number | r | d1 | d2 | n650 | n780 | vd |
|---|---|---|---|---|---|---|
| #1 | 2.193 | 2.300 | 2.300 | 1.54082 | 1.53677 | 55.6 |
| #2 | −8.740 | 1.831 | 1.471 | | | |
| #3 | ∞ | 0.600 | 1.200 | | | |
| #4 | ∞ | | | | | |

TABLE 9

|  | Surface #1 | Surface #2 |
|---|---|---|
| K | −0.4400 | 0.0000 |
| $A_4$ | $-0.2530 \times 10^{-2}$ | $0.1316 \times 10^{-1}$ |

TABLE 10

| $\lambda_1 = 635$ nm  NA 0.60 | f = 3.50 mm  $f_D = \infty$ | $\omega = 1.0°$ | $h_{45} = 1.23$ mm (#2) |
|---|---|---|---|
| $\lambda_2 = 780$ nm  NA 0.50 | f = 3.53 mm | $\omega = 1.0°$ | |
| $\lambda_B = 690$ nm | | | |

| Surface Number | r | d1 | d2 | n650 | n780 | νd |
|---|---|---|---|---|---|---|
| #1 | 2.199 | 1.930 | 1.930 | 1.54142 | 1.53677 | 55.6 |
| #2 | −9.484 | 2.042 | 1.685 | | | |
| #3 | ∞ | 0.600 | 1.200 | | | |
| #4 | ∞ | | | | | |

TABLE 11

| | Surface #1 | Surface #2 |
|---|---|---|
| K | −0.4400 | 0.0000 |
| $A_4$ | $-0.9330 \times 10^{-3}$ | $0.1600 \times 10^{-1}$ |
| $A_6$ | $-0.3370 \times 10^{-4}$ | $-0.2886 \times 10^{-2}$ |
| $A_8$ | $-0.5210 \times 10^{-4}$ | $0.1721 \times 10^{-3}$ |
| $A_{10}$ | $0.7400 \times 10^{-5}$ | $0.2300 \times 10^{-6}$ |
| $A_{12}$ | $-0.3100 \times 10^{-5}$ | 0.0000 |
| $P_2$ | | 0.0 |
| $P_4$ | | −5.2894 |
| $P_6$ | | $9.3630 \times 10^{-1}$ |
| $P_8$ | | $-5.9940 \times 10^{-2}$ |
| $P_{10}$ | | $1.8211 \times 10^{-4}$ |

In the above described numerical construction of the fifth embodiment, the diffractive lens structure, which is blazed for 690 nm, is formed on the second surface within the entire region in an effective radius. On the other hand, the peripheral region may be optimized for the thin cover type optical disc. The peripheral region is defined as a region where a height from the optical axis falls in the range of 84.0% through 100% of the effective radius in the fifth embodiment as well as in the third embodiment In order to optimize the peripheral region for the thin cover type optical disc, the peripheral region may be formed as the diffractive lens structure blazed for 635 nm or the continuous surface compensated in aberrations for 635 nm.

EMBODIMENT 6

Figure 23:
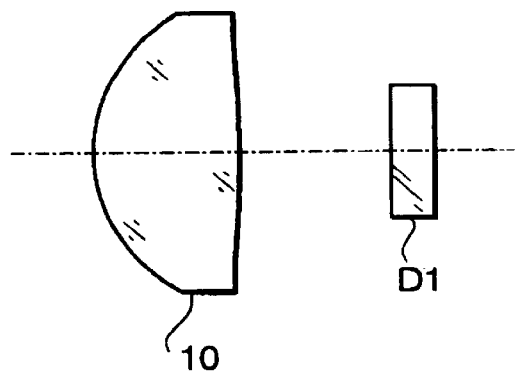
FIG. 23 is a lens diagram of the objective lens according to a sixth embodiment with the cover layer of the thin cover type optical disc.
Figure 25:
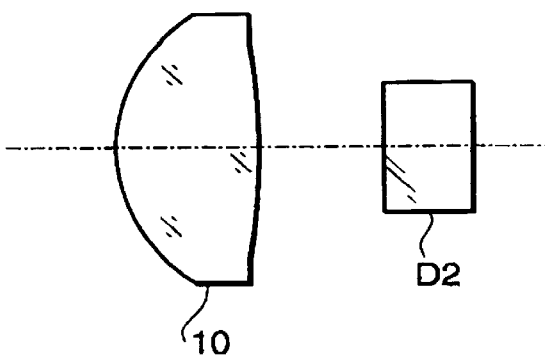
FIG. 25 is a lens diagram of the objective lens according to the fifth embodiment with the cover layer of the thick cover type optical disc.
Figure 26A:
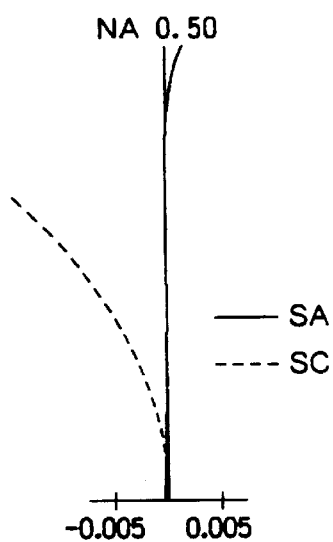
FIGS. 26A, 26B and 26C are graphs showing various aberrations of the objective lens according to the fifth embodiment when the thick cover type optical disc is used.
Figure 26B:
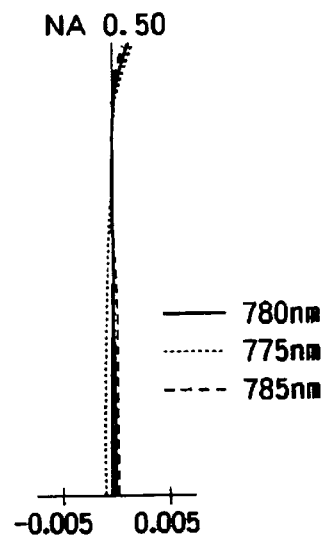
Figure 26C:
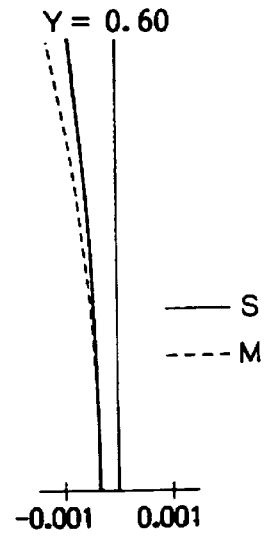

FIG. 23 shows the objective lens 10 of the sixth embodiment and the cover layer $D_1$ of the thin cover type optical disc. FIG. 25 shows the objective lens 10 with the cover layer $D_2$ of the thick cover type optical disc. The numerical construction of the sixth embodiment is indicated in TABLE 12. TABLE 13 shows conic constants and aspherical surface coefficients for the first and second surfaces, and diffractive coefficients of the diffractive lens structure formed on the second surface.

Figure 24A:
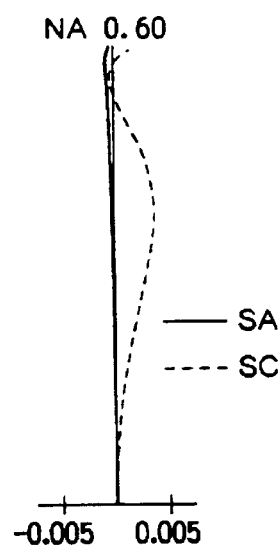
FIGS. 24A, 24B and 24C are graphs showing various aberrations of the objective lens according to the fifth embodiment when the thin cover type optical disc is used.
Figure 24B:
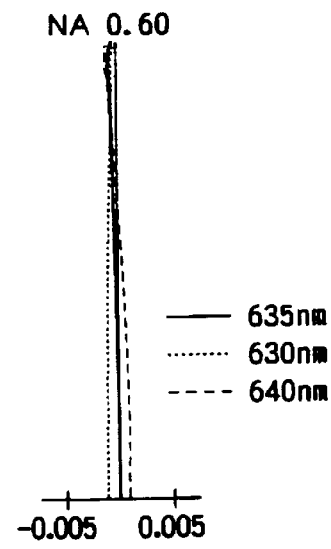
Figure 24C:
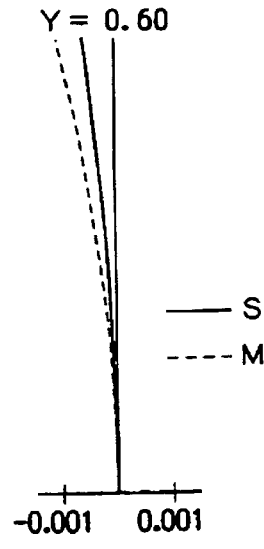

FIGS. 24A through 24C show various aberrations of the objective lens according to the sixth embodiment when the thin cover type optical disc is used at wavelength of 650 nm. FIGS. 25A through 25C show various aberrations when the thick cover type optical disc is used at wavelength of 780 nm.

TABLE 12

$\lambda_1$ = 650 nm  NA 0.60   f = 3.50 mm   $f_D$ = 202.10 mm   ω = 1.0°   $h_{45}$ = 1.23 mm (#2)
$\lambda_2$ = 780 nm  NA 0.50   f = 3.53 mm                     ω = 1.0°
$\lambda_B$ = 710 nm

| Surface Number | r | d1 | d2 | n650 | n780 | νd |
|---|---|---|---|---|---|---|
| #1 | 2.207 | 1.930 | 1.930 | 1.54082 | 1.53677 | 55.6 |
| #2 | −10.066 | 2.042 | 1.685 | | | |
| #3 | ∞ | 0.600 | 1.200 | | | |
| #4 | ∞ | | | | | |

TABLE 13

| | Surface #1 | Surface #2 |
|---|---|---|
| K | −0.4400 | 0.0000 |
| $A_4$ | $-0.8170 \times 10^{-3}$ | $0.1600 \times 10^{-1}$ |
| $A_6$ | $0.3070 \times 10^{-4}$ | $0.2930 \times 10^{-2}$ |
| $A_8$ | $-0.4850 \times 10^{-4}$ | $0.1875 \times 10^{-3}$ |
| $A_{10}$ | $0.6320 \times 10^{-5}$ | $-0.1225 \times 10^{-5}$ |
| $A_{12}$ | $-0.2820 \times 10^{-5}$ | 0.0000 |
| $P_2$ | | −3.8063 |
| $P_4$ | | −5.3042 |
| $P_6$ | | $9.2234 \times 10^{-1}$ |
| $P_8$ | | $-5.7284 \times 10^{-2}$ |
| $P_{10}$ | | $-3.4616 \times 10^{-4}$ |

In the above described numerical construction of the sixth embodiment, the diffractive lens structure, which is blazed for 710 nm, is formed on the second surface within the entire region in an effective radius. On the other hand, the peripheral region may be optimized for the thin cover type optical disc. The peripheral region is defined as a region where a height from the optical axis falls in the range of 84.0% through 100% of the effective radius in the sixth embodiment as well as in the third embodiment.

In order to optimize the peripheral region for the thin cover type optical disc, the peripheral region may be formed as the diffractive lens structure blazed for 650 nm or the continuous surface compensated in aberrations for 650 nm.

The following TABLE 14 shows the values of the first to sixth embodiments for the conditions (1), (2), (3), (4), (5) and (6). Since all of the embodiments satisfy the condition (1), the deterioration of the wave front aberration due to change of the cover layer's thickness can be reduced. The conditions is (2) and (3) are satisfied in all of the embodiments, which reduces the movement of the best focus position due to rapid shift of wavelength. Since all of the embodiments satisfy the conditions (4), (5) and (6), the changes of the longitudinal chromatic aberration and the spherical aberration due to shift of wavelength can be well balanced, the objective lenses of these embodiments further reduce the movement of the best focus position.

TABLE 14

|  | Embodiments | | | | | |
| --- | --- | --- | --- | --- | --- | --- |
|  | 1 | 2 | 3 | 4 | 5 | 6 |
| Condition (1) $\Phi(h_{45})/\lambda - P_2 \times (h_{45})^2$ | −10.6 | −0.36 | 0.010 | 0.833 | 0.910 | 1.092 |
| Condition (2) $\Delta CA/\Delta SA$ | −9.7 | −0.26 | 0.010 | 0.814 | 0.885 | 1.087 |
| Condition (3) $f/f_D$ | −9.4 | −0.50 | 0.000 | 0.814 | 0.885 | 1.087 |
| Condition (4) $\lambda_1/\lambda_2$ | −10.2 | −0.43 | 0.000 | 0.833 | 0.910 | 1.092 |
| Condition (5) $\lambda_B/\lambda_2$ | −9.2 | −0.78 | 0.000 | 0.814 | 0.885 | 1.087 |
| Condition (6) $\lambda_B/\lambda_1$ | −9.3 | −0.47 | 0.017 | 0.833 | 0.910 | 1.092 |

The present disclosure relates to the subject matter contained in Japanese Patent Application No. HEI 10-218490, filed on Jun. 26, 1998, which is expressly incorporated herein by reference in its entirety.

What is claimed is:

1. An objective lens for an optical head, comprising:
a refractive lens having a positive refractive power; and
a diffractive lens structure having a plurality of concentric ring-shaped steps that are formed on at least one lens surface of said refractive lens,
wherein said diffractive lens structure has wavelength dependence such that at least two light beams having different wavelength with an identical diffractive order form appropriate wavefronts for at least two kinds of optical discs respectively provided with cover layers having different thickness.

2. The objective lens according to claim 1, wherein said diffractive lens structure has the wavelength dependence such that a first wavelength diffractive light forms an appropriate wavefront for an optical disc having a thinner cover and a second wavelength diffractive light forms an appropriate wavefront for an optical disc having a thicker cover layer, said first wavelength being shorter than said second wavelength.

3. The objective lens according to claim 1, wherein said diffractive lens structure has said wavelength dependence such that spherical aberration varies in the undercorrected direction as wavelength of incident light increases.

4. The objective lens according to claim 1, wherein the following condition (1) is satisfied;

$$-15 < \Phi(h_{45})/\lambda - P_2 \times (h_{45})^2 < -7 \quad (1)$$

where $h_{45}$ is the height from the optical axis of a point where a light ray of which NA is 0.45 intersects said diffractive lens structure, $\lambda$ is the wavelength of said light, and $P_2$ is a second order coefficient when an additional optical path length added by said diffractive lens structure is expressed by the following optical path difference function $\Phi(h)$:

$$\Phi(h) = (P_2 h^2 + P_4 h^4 + P_6 h^6 + \ldots) \times \lambda$$

where $P_4$ and $P_6$ are coefficients of forth and sixth orders, and h is a height from the optical axis.

5. The objective lens according to claim 1, wherein said refractive lens and said diffractive lens structure have a total longitudinal chromatic aberration such that the backfocus increases as the wavelength of the incident light increases, and wherein the following condition (2) is satisfied;

$$-0.8 < \Delta CA/\Delta SA < -0.2 \quad (2)$$

where $\Delta CA$ is a movement of a paraxial focal point with shift of wavelength and $\Delta SA$ is variation of spherical aberration for marginal rays with said shift of wavelength.

6. The objective lens according to claim 1, wherein said diffractive lens structure has a small paraxial power, and wherein the following condition (3) is satisfied;

$$-0.020 < f/f_D < 0.020 \quad (3)$$

where f is the total focal length of said objective lens at said shorter wavelength, and $f_D$ is the focal length of said diffractive lens structure at said shorter wavelength that is defined as the following equation;

$$f_D = 1/(-P_2 \times 2\lambda)$$

where $P_2$ is a second order coefficient when an additional optical path length added by said diffractive lens structure is expressed by the following optical path difference function $\Phi(h)$:

$$\Phi(h) = (P_2 h^2 + P_4 h^4 + P_6 h^6 + \ldots) \times \lambda$$

where $P_4$ and $P_6$ are coefficients of fourth and sixth orders, h is a height from the optical axis and $\lambda$ is wavelength of incident light.

7. The objective lens according to claim 1, wherein said diffractive lens structure is designed to satisfy the following condition (4);

$$0.75 < \lambda_1/\lambda_2 < 0.87 \quad (4)$$

where $\lambda_1$ is wavelength of said light for said optical disc having the 0.6 mm cover layer, and $\lambda_2$ is wavelength of said light for said optical disc having the 1.2 mm cover layer.

8. The objective lens according to claim 7, wherein the blazed wavelength $\lambda_B$ of said diffractive lens structure in the center region around the optical axis satisfies a condition of $\lambda_1 < \lambda_B < \lambda_2$.

9. The objective lens according to claim 8, wherein the blazed wavelength $\lambda_B$ of said diffractive lens structure in said center region satisfies the following conditions (5) and (6);

$$0.87 < \lambda_B/\lambda_2, \quad (5)$$

$$\lambda_B/\lambda_1 < 1.13. \quad (6)$$

10. The objective lens according to claim 8, wherein the blazed wavelength of said diffractive lens structure in the peripheral region is shorter than said blazed wavelength $\lambda_B$ of said diffractive lens structure in said center region.

11. The objective lens according to claim 1, wherein the peripheral region of the lens surface on which said diffractive lens structure is formed is a continuous surface without steps, said peripheral region is defined as a region where a height from the optical axis falls in the range of 85% through 100% of the effective radius of said refractive lens.

* * * * *

UNITED STATES PATENT AND TRADEMARK OFFICE
CERTIFICATE OF CORRECTION

PATENT NO. : 6,118,594
DATED : September 12, 2000
INVENTOR(S) : Koichi MARUYAMA

It is certified that error appears in the above-identified patent and that said Letters Patent is hereby corrected as shown below:

On the title page item [22], change "June 29, 1999" to ---June 25, 1999---.

Signed and Sealed this

Nineteenth Day of December, 2000

Attest:

Q. TODD DICKINSON

Attesting Officer

Commissioner of Patents and Trademarks